United States Patent [19]

Reichardt et al.

[11] Patent Number: 5,320,552

[45] Date of Patent: Jun. 14, 1994

[54] CONTACTING APPARATUS, IN PARTICULAR A CONTACTING APPARATUS FOR A SUBSCRIBER IDENTITY MODULE

[75] Inventors: Manfred Reichardt, Weinsberg; Martina Tolksdorf, Heilbronn, both of Fed. Rep. of Germany

[73] Assignee: Amphenol-Tuchel Electronics GmbH, Fed. Rep. of Germany

[21] Appl. No.: 777,538

[22] PCT Filed: Mar. 18, 1991

[86] PCT No.: PCT/EP91/00510

§ 371 Date: Dec. 9, 1991

§ 102(e) Date: Dec. 9, 1991

[87] PCT Pub. No.: WO91/15101

PCT Pub. Date: Oct. 3, 1991

[30] Foreign Application Priority Data

Mar. 17, 1990 [DE] Fed. Rep. of Germany ..... 40086550

[51] Int. Cl.⁵ ............................................. H01R 13/62
[52] U.S. Cl. ..................................... 439/331; 439/326; 439/630
[58] Field of Search ............... 439/59, 73, 325, 326, 439/327, 328, 329, 188, 331, 629, 630, 633, 635, 636, 260; 235/441, 482, 483, 486; 200/51.1

[56] References Cited

U.S. PATENT DOCUMENTS

| | | | |
|---|---|---|---|
| 3,883,856 | 5/1975 | Saito et al. | 340/173 |
| 4,216,522 | 8/1980 | Slagel et al. | 361/392 |
| 4,327,953 | 5/1982 | Slagel et al. | |
| 4,443,049 | 4/1984 | DePommery et al. | |
| 4,449,775 | 5/1984 | DePommery et al. | |
| 4,516,188 | 5/1985 | Kessler | 361/408 |
| 4,706,811 | 11/1987 | Jung et al. | 206/331 |
| 4,723,195 | 2/1988 | Mizzi et al. | 361/393 |
| 4,820,186 | 4/1989 | Fujii | 439/326 |
| 4,843,223 | 6/1989 | Shino | 235/487 |
| 4,900,272 | 2/1990 | Langé et al. | 439/73 X |
| 5,013,255 | 5/1991 | Juret et al. | 439/630 X |
| 5,026,297 | 6/1991 | Krehbiel | 439/326 |
| 5,127,837 | 7/1992 | Shah et al. | 439/331 |

FOREIGN PATENT DOCUMENTS 60-173789 9/1985 Japan .
60-173790 9/1985 Japan .

Primary Examiner—Larry I. Schwartz
Assistant Examiner—Khiem Nguyen
Attorney, Agent, or Firm—Bacon & Thomas

[57] ABSTRACT

Contractor device, especially for an SIM which has a contact holder having a pull-out stop or a cover to hold the SIM in its reading position in order to hold the SIM in the contact holder and especially in a recess therein.

16 Claims, 16 Drawing Sheets

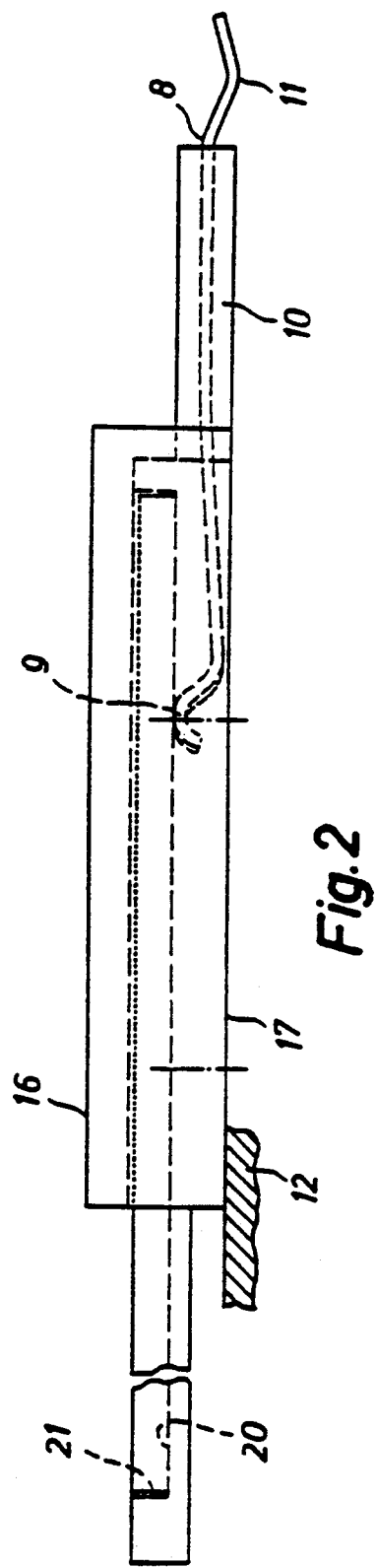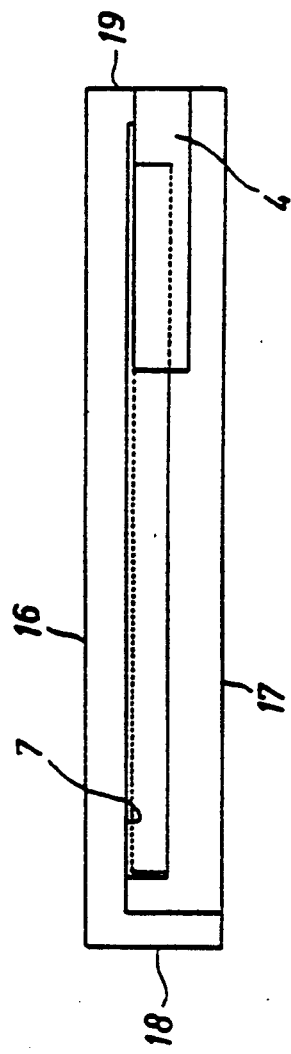

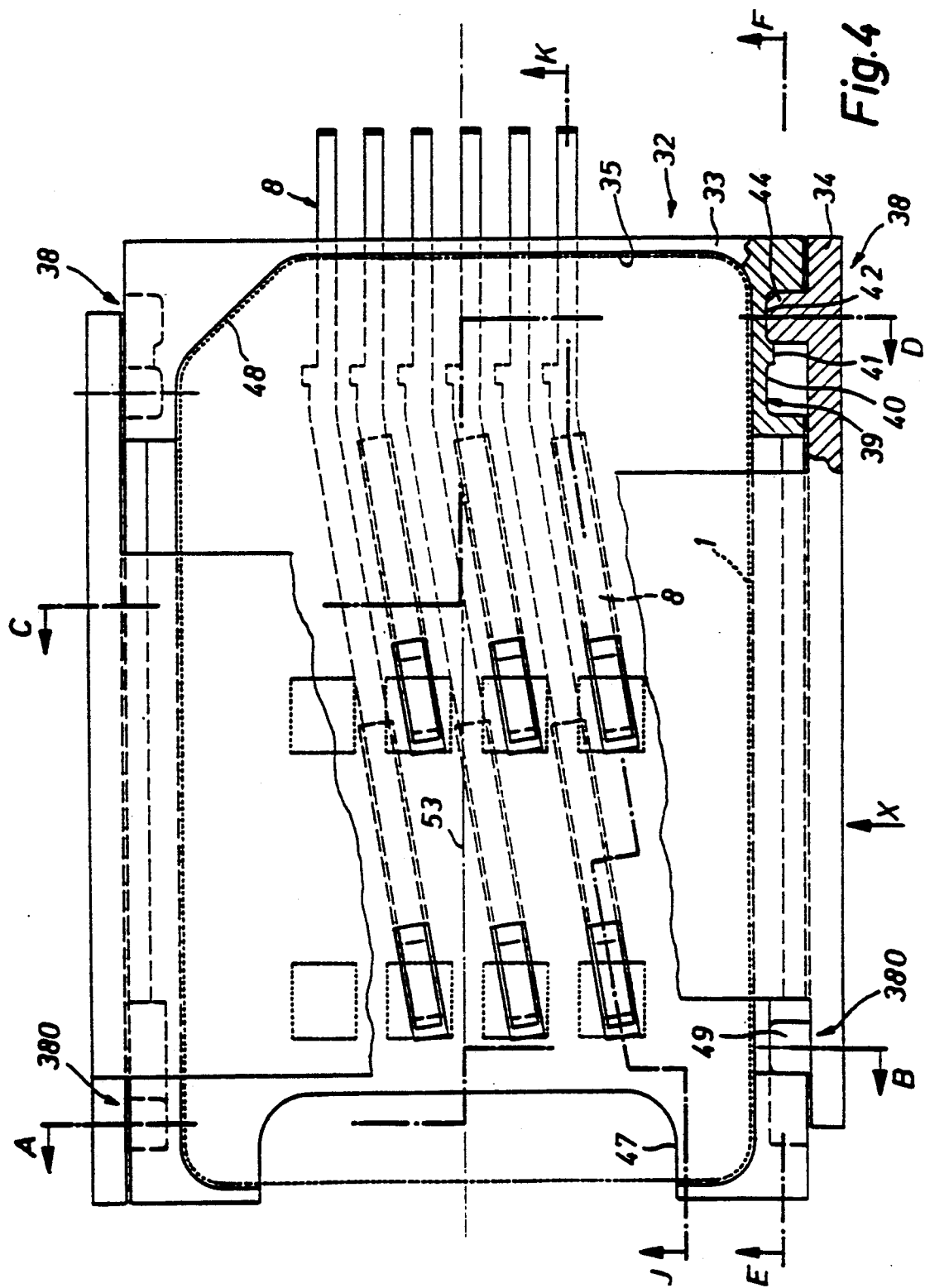

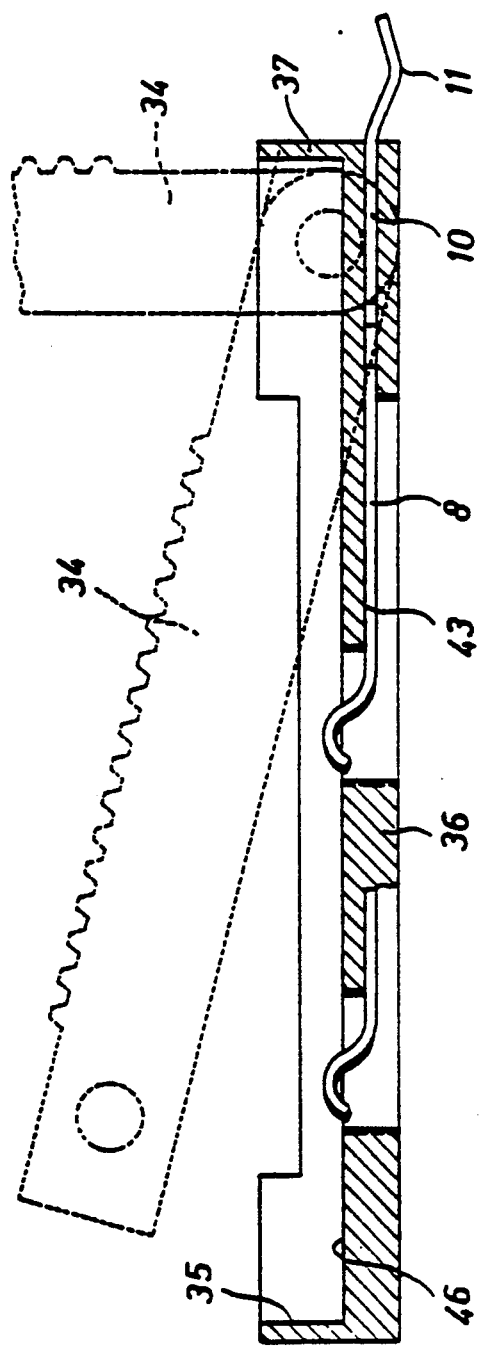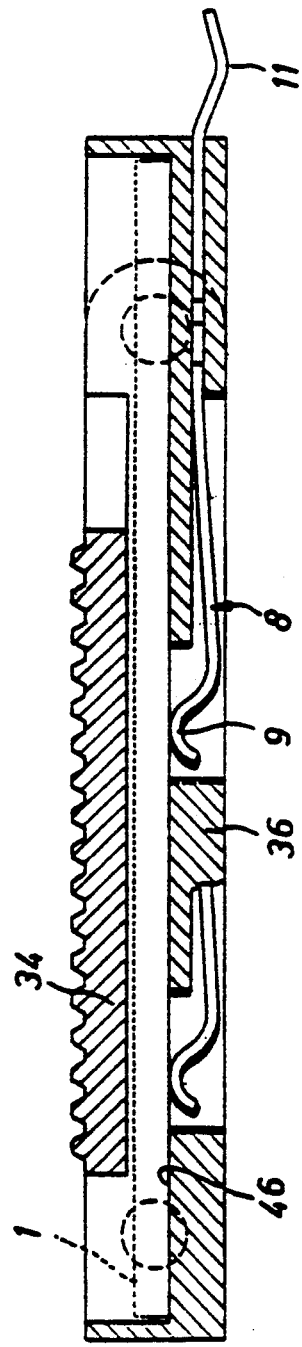

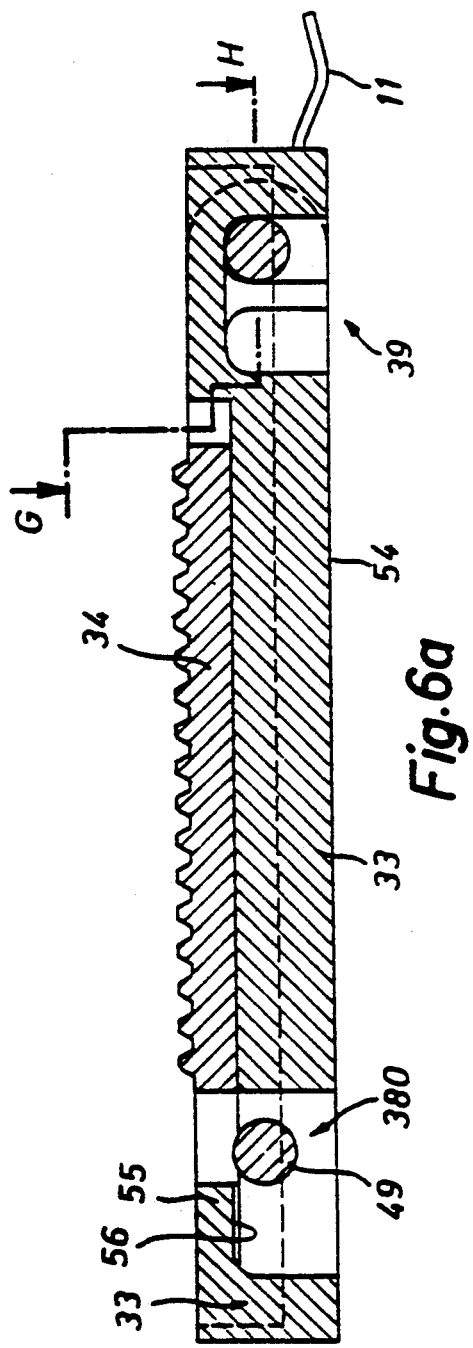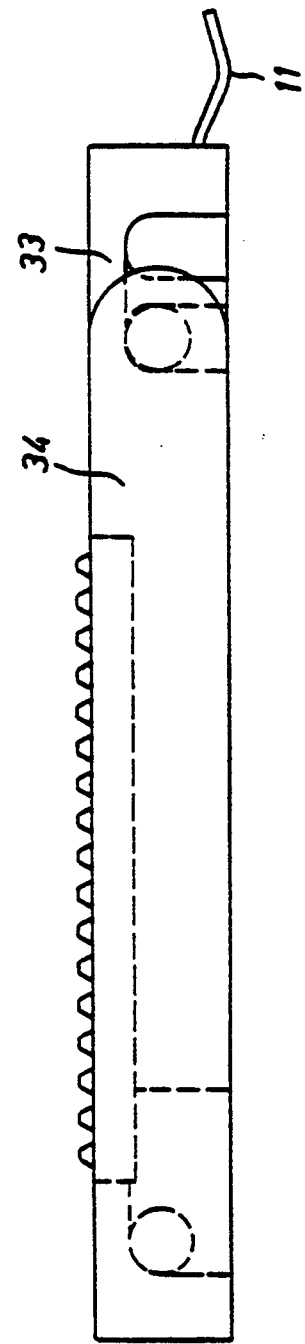
Fig.6a
Fig.6b

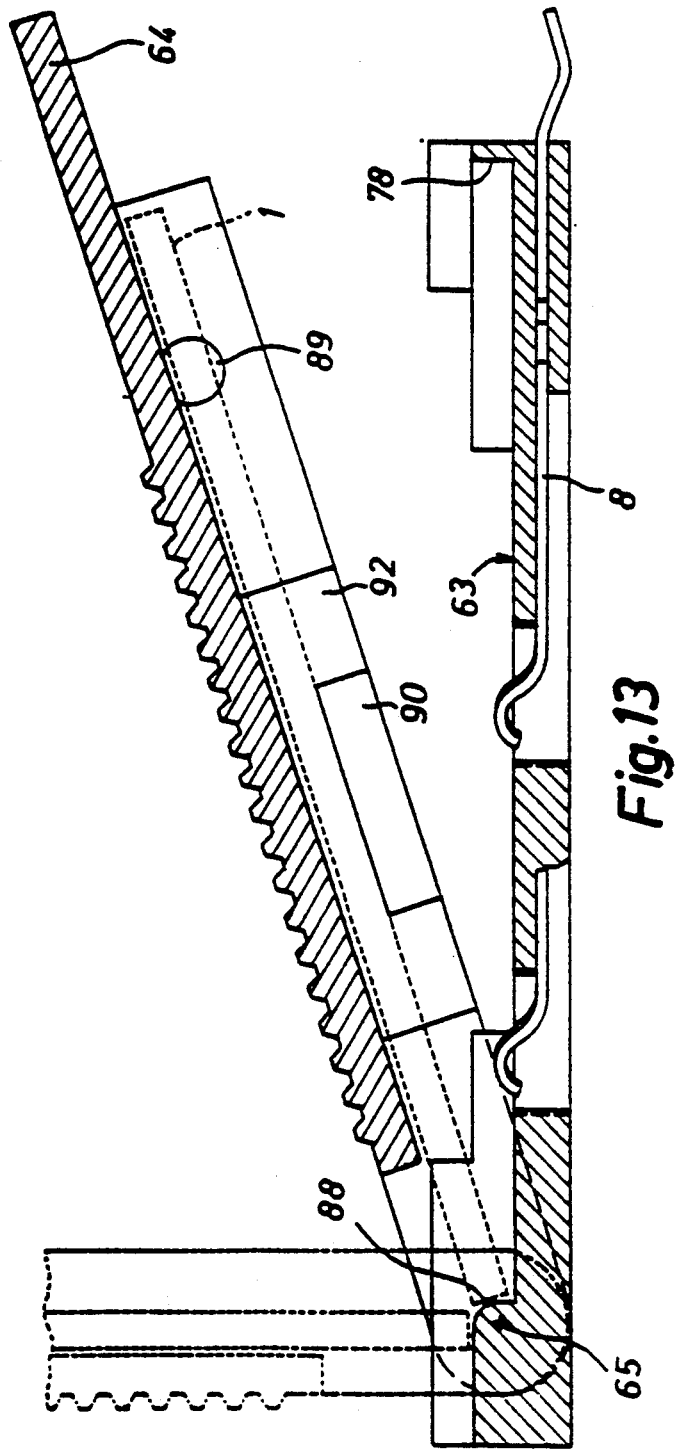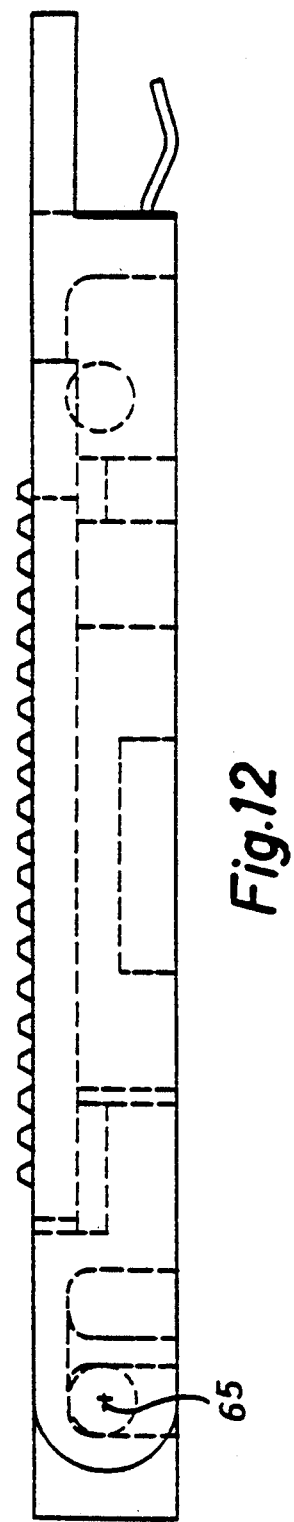
Fig.13
Fig.12

Fig. 21
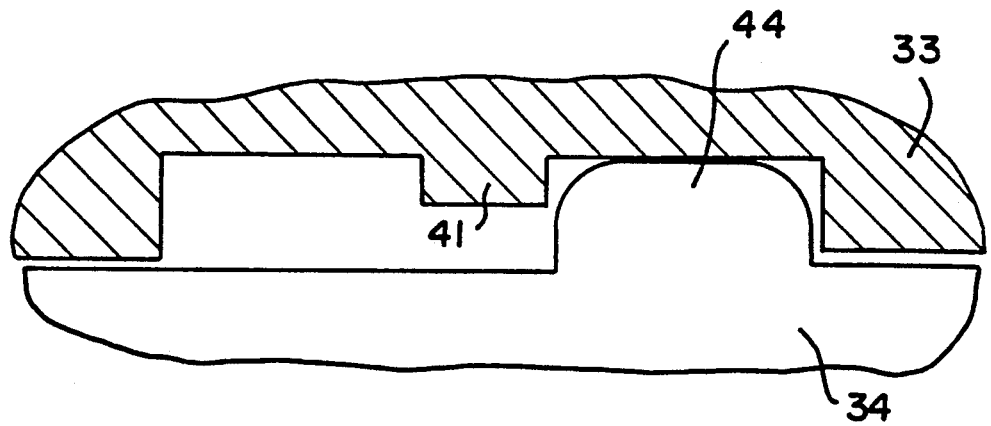
Fig. 22
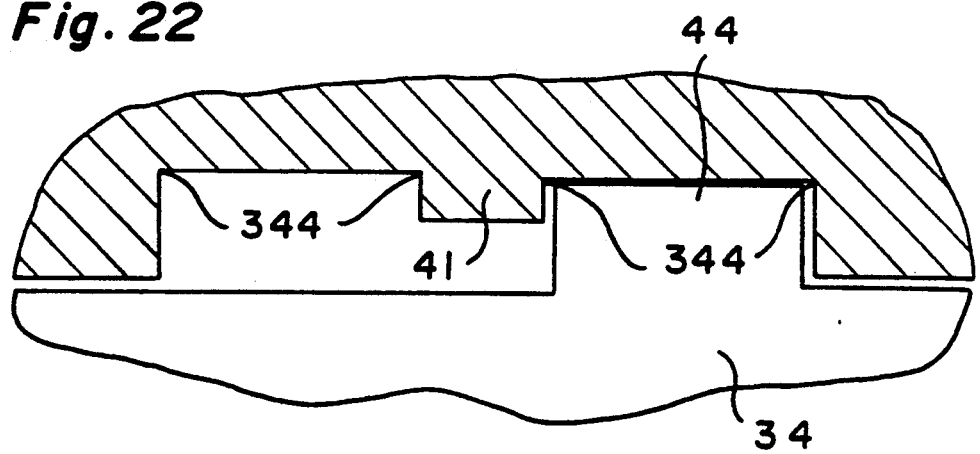
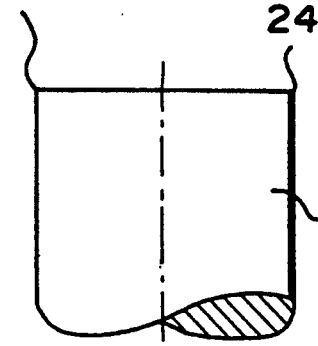
Fig. 23
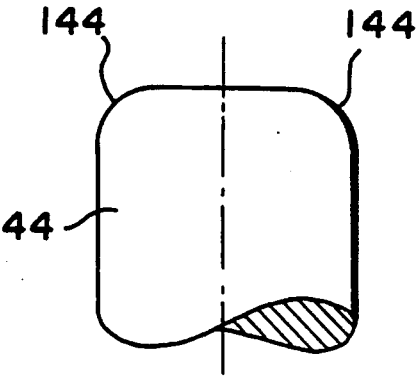
Fig. 24

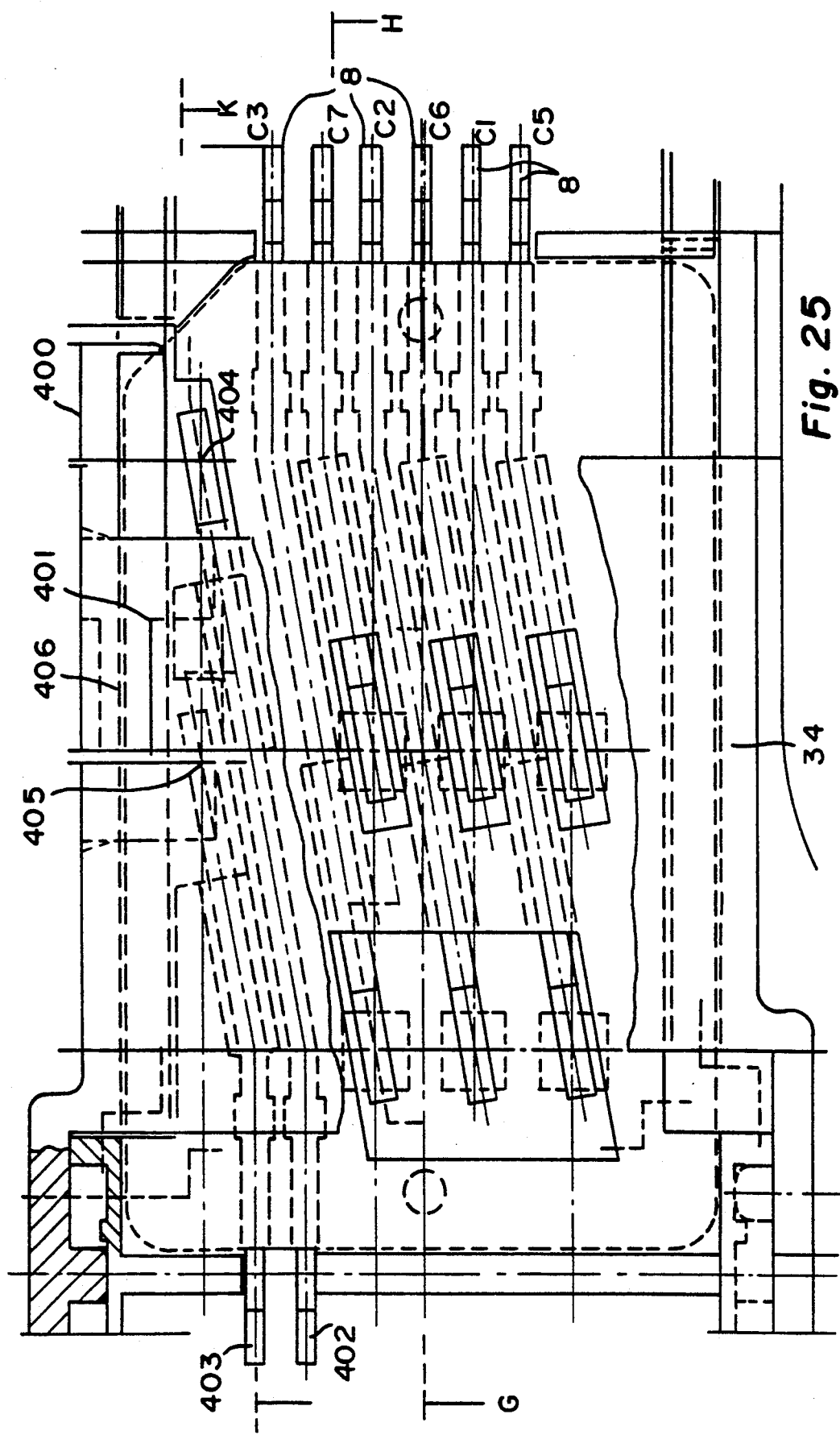

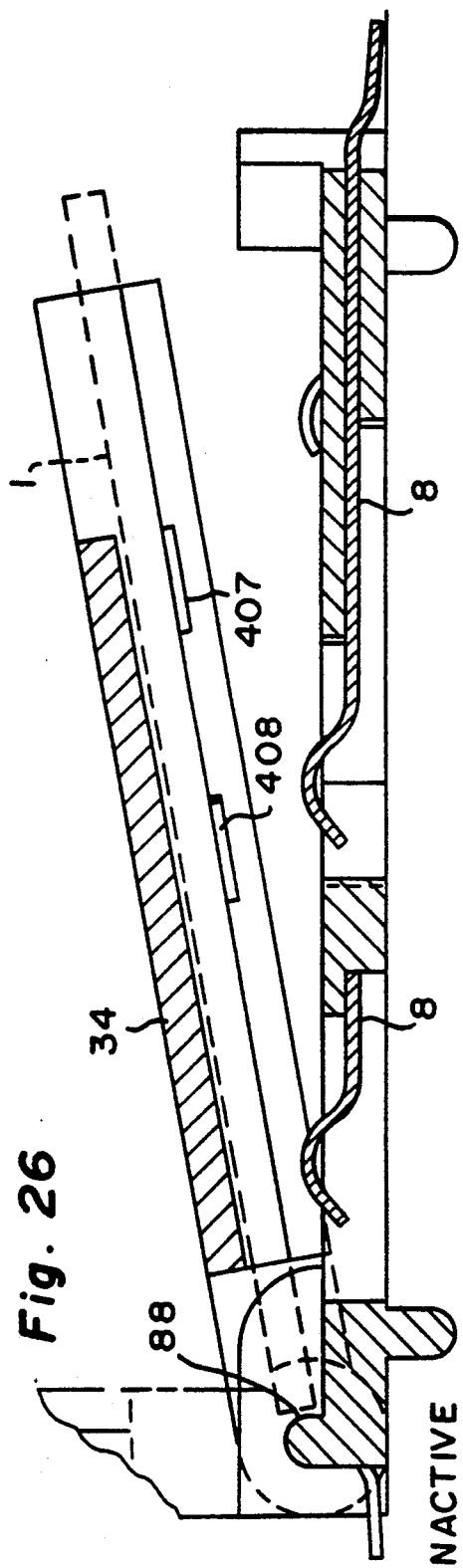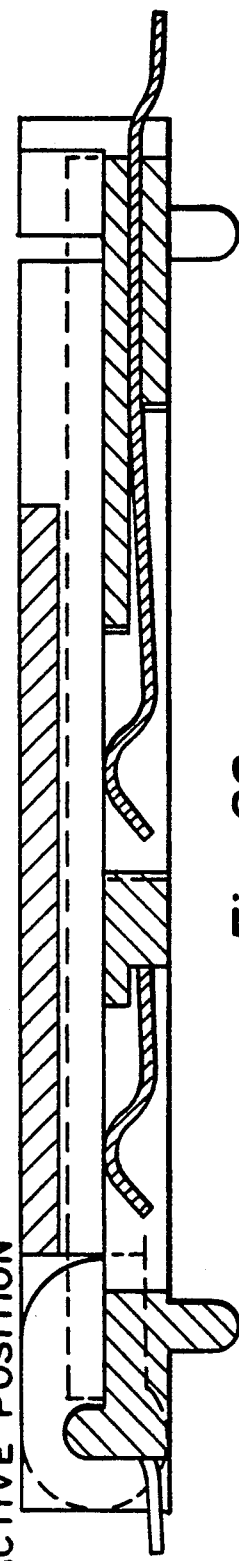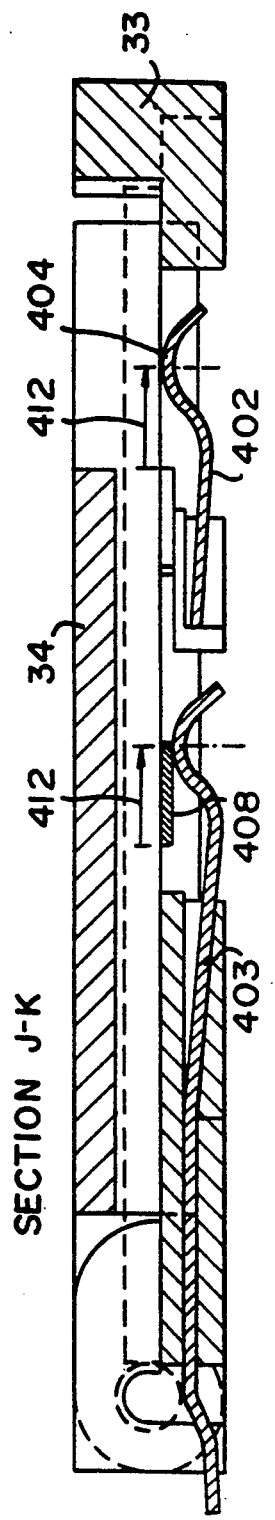

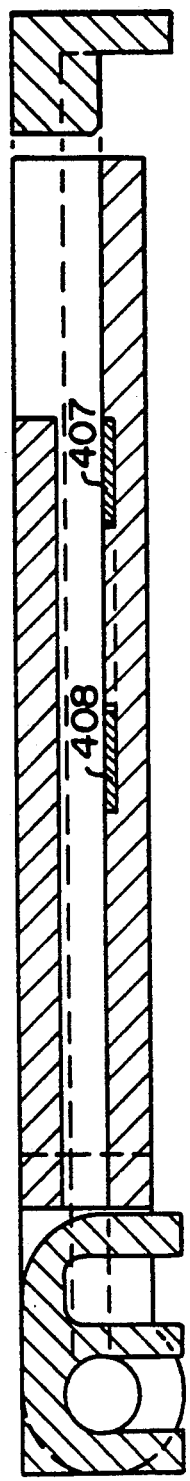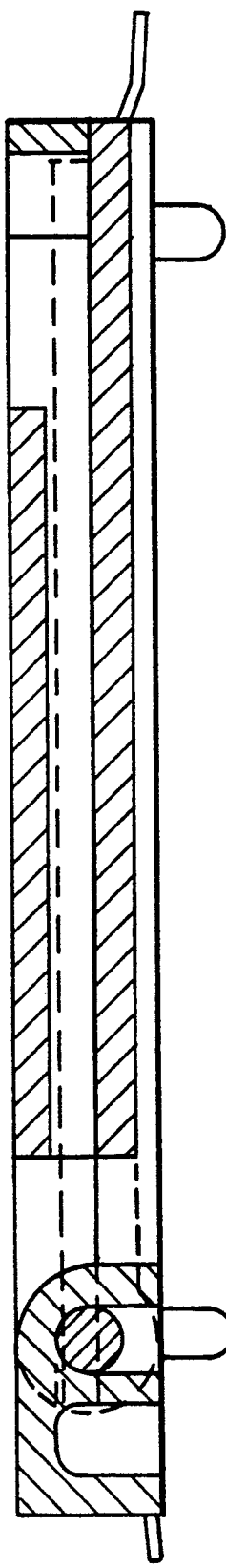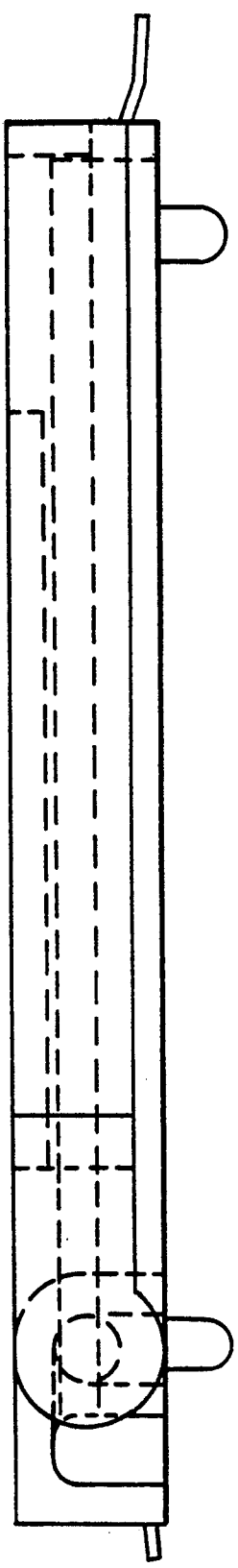
Fig. 29 SECTION L-M — HINGED COVER UNLOCKED
Fig. 30 SECTION E-F
Fig. 31 — HINGED COVER LOCKED

CONTACTING APPARATUS, IN PARTICULAR A CONTACTING APPARATUS FOR A SUBSCRIBER IDENTITY MODULE

The present invention relates to contacting apparatus for so called chip cards or IC-cards. Preferably the invention relates to a contacting apparatus for a SIM. A SIM is a module which identifies the identity of a subscriber (for instance a telephone subscriber). The abbreviation SIM is derived from the English term "Subcriber Identity Module". The contact layout of such a module corresponds to the contact layout of an IC card in accordance with ISO 7816; however, the outer dimensions of the SIM are significantly smaller, i. e. they are 25×15 mm, compared with 85,5×54 mm for the IC card.

The present invention intends to provide a contacting apparatus, specifically a contacting apparatus for a SIM, such that the outer dimensions of the contacting apparatus are not significantly larger than the dimensions of the SIM itself. Moreover, the operation of the contacting apparatus, i. e. the insertion and the removal, respectively, of the SIM should be convenient to the user and it should be possible without any tools. Moreover, it is prefered that no separate components are neccessary, for instance, a separate cover.

In accordance with the invention, a contacting apparatus is provided in particular for a SIM, wherein the SIM can be placed in a recess or a deeper portion (niche) of a housing serving as a contact support; alternatively, the SIM can be located in a recess of a cover mounted at the housing.

In accordance with a prefered embodiment of the invention, the contacting apparatus comprises a housing which is used as a contact support and into which the SIM can be inserted for the purpose of being contacted; an abutment means (support arm) is adapted to hold the SIM in the housing and comprises a recess for receiving the SIM. Said abutment means preferably projects from one side of the apparatus and can be resiliently moved to allow when insertion of the SIM (card). Preferably the card and the SIM, respectively, is easily accessible and the location and the polarisation of the card being guaranteed by the abutment means projecting at one side. This solution is particulary advantageous at the periphery of (date processing) apparatus.

In accordance with another prefered embodiment of the invention a housing designed as a contact support is provided. In the contact support a niche or a recess is formed having an inclined polarisation means such that the SIM is always inserted with the proper side orientation. Preferably, a cover is rotatably mounted at the contact support. The initial position to which the cover is rotated is a closed but unlocked position, from which the cover can then be linearly moved, relative to a chip card held in the recess, to a locked position where it is held by a detent. When moved back to the unlocked position, the cover can be opened and the card is then removed upon lifting the cover. The cover is held by detent means in both the locking and de-locking position. In the de-locking condition the cover can be opened together with the card or the SIM by lifting the cover.

Perferably, the cover is pivotably mounted at the contact support such that the cover can easily be moved, or, it is also possible that due to a frictional force the cover remains in any of the opening positions.

In accordance with another embodiment a spring element is provided which biases the cover towards the delocking condition.

The invention further provides a contacting apparatus in which the SIM or the card is not placed in the contact support, but is inserted into a tunnel (shaft) of the cover, said tunnel providing for a sideways guidance of the SIM. An abutment shoulder at the contact support limits the depth of insertion of the card. When the cover is closed, the card (or the SIM) will be rotated circulary along the abutment shoulder into the recess of the contact support. The card remains in said recess when the cover is longitudinally moved for locking purposes, so that no relative movement occurs between the card and the contact element. Again here, an alternative embodiment with a spring element (cover spring) is possible.

Perfered embodiments of the invention are disclosed in the dependent claims. Perferably the housing and the cover, respectively, are made of plastic material.

Additional advantages, objects and details of the invention will result from the following description of embodiments when refering to the drawings.

FIG. 1 a plan view of a first embodiment of a contacting apparatus;

FIG. 2 is a side elevational view of the contacting apparatus of FIG. 1 seen in the direction of arrow X;

FIG. 3 is a side elavational view of the contacting apparatus of FIG. 1 seen in the direction of arrow Y;

FIG. 4 is a plan view of a contacting apparatus in accordance with a second embodiment of the invention;

FIG. 5 is a sectional view JK in FIG. 4 with the cover being closed (reading position);

FIG. 6 is a sectional view JK in FIG. 4 with the cover being opened (input-output position);

FIG. 6a is a sectional view along line E-F in FIG. 4;

FIG. 6b is a view in the direction of arrow X in FIG. 4 wherein the cover is in its locking position;

Figure 8:
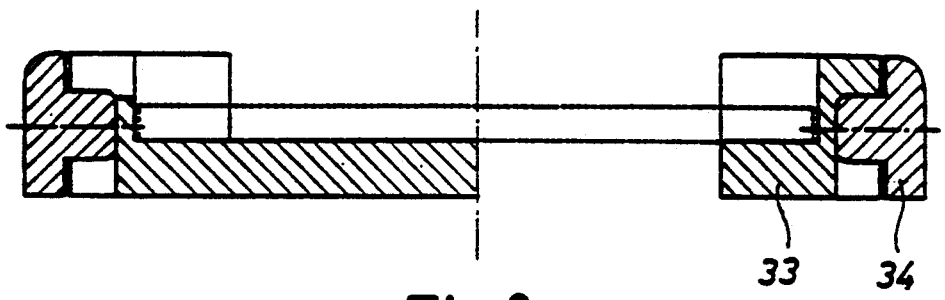
Figure 9:
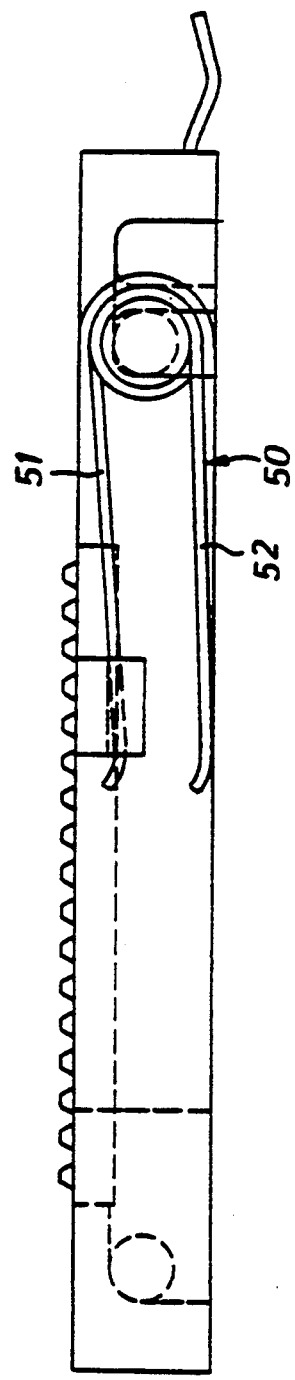
Figure 10:
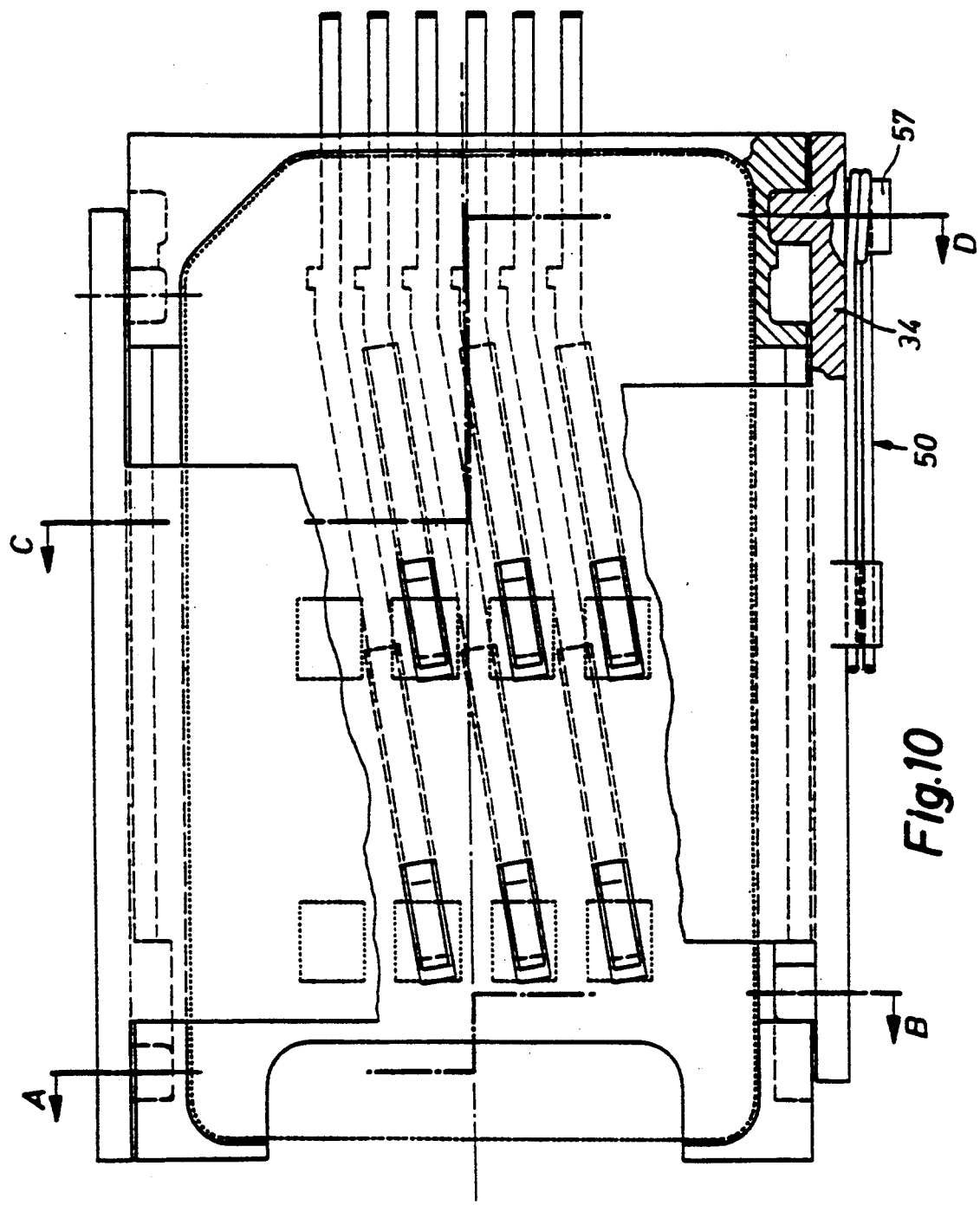
Figure 11:
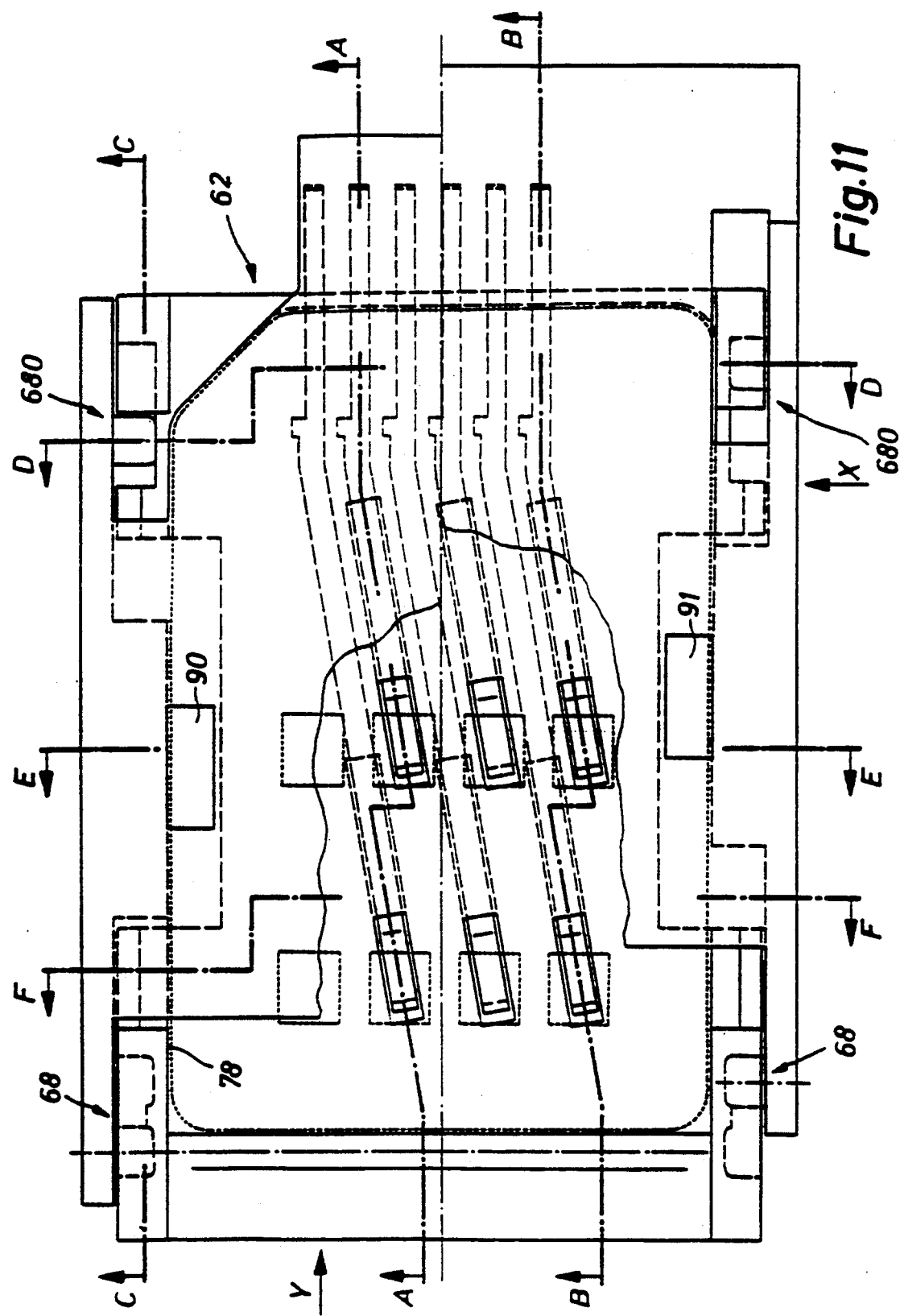
Figure 14:
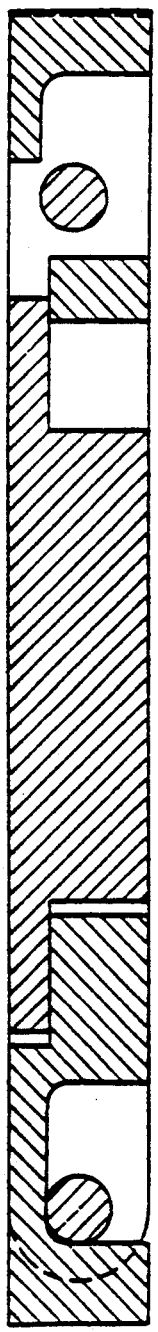
Figure 15:
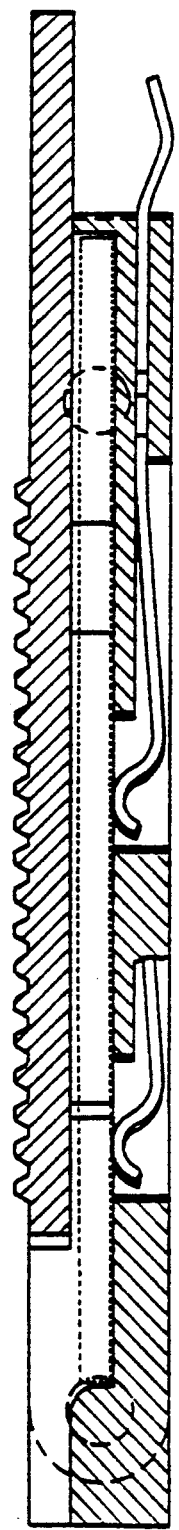
Figure 16:
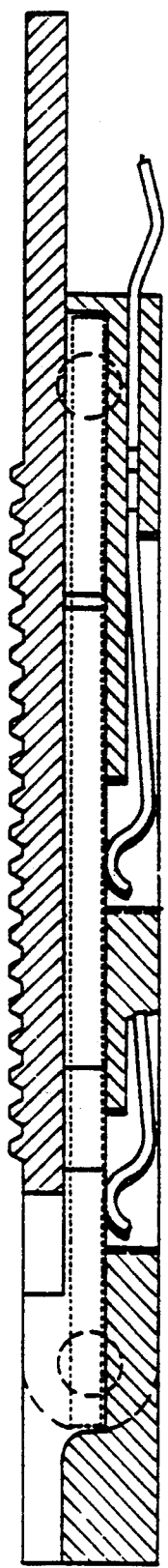
Figure 17:
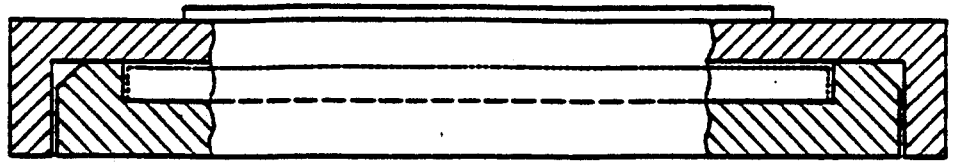
Figure 18:
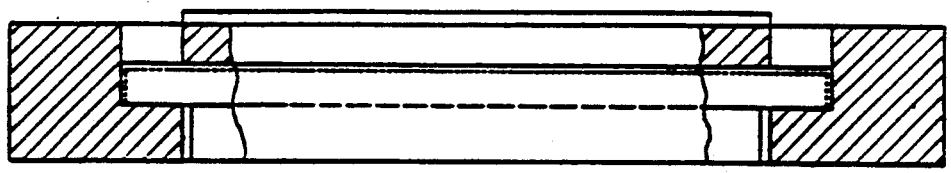
Figure 19:
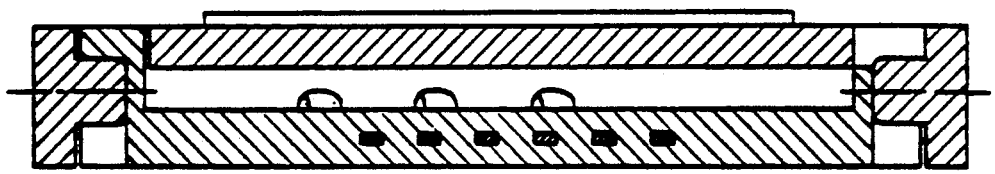
Figure 20:

FIG. 8 a sectional view along line A-B in FIG. 4;

FIG. 9 is a view similar to FIG. 5, showing for the third embodiment the additional use of a spring;

FIG. 10 is a plan view similar to FIG. 4 for a contacting apparatus shown in FIG. 9;

FIG. 11 is a plan view of a contacting apparatus of a forth embodiment;

FIG. 12 is a view of the contacting apparatus seen in the direction of arrow X in FIG. 11;

FIG. 13 is a sectional view along line BB in FIG. 11;

FIG. 14 is a sectional view along line CC in FIG. 11;

FIG. 15 is a sectional view along line AA in FIG. 11;

FIG. 16 is a sectional view along line BB in FIG. 11;

FIG. 17 is a sectional view along line FF in FIG. 11;

FIG. 18 is a sectional view along line EE in FIG. 11;

FIG. 19 is a sectional view along line DD in FIG. 11;

FIG. 20 is a view in the direction of arrow Y in FIG. 11;

FIG. 21 is a detail of the right lower part of FIG. 4 for a closed cover which is not yet moved into its reading position;

FIG. 22 is a view similar to FIG. 21 with the cover being shown in its opening position;

FIG. 23 is a detail of the pin of FIG. 22;

FIG. 24 is a detail of the pin of FIG. 21;

FIG. 25 is a plan view of a contacting apparatus in accordance with a fifth embodiment;

FIG. 26 is a sectional view along line G-H in FIG. 25, wherein the cover is shown in a position between its opening position and its closing position;

FIG. 27 sectional view along line G-H wherein the cover is in its active or closed position;

FIG. 28 sectional view along line J-K in FIG. 25, i. e. the area of the switching contacts, wherein the cover is like in FIG. 27 in its active position, but not yet in its reading position;

FIG. 29 is a sectional view along line L-M in FIG. 25, wherein the cover is not locked;

FIG. 30 is a sectional view E-F in FIG. 25; and

FIG. 31 shows the cover in its locking position.

Figure 1:
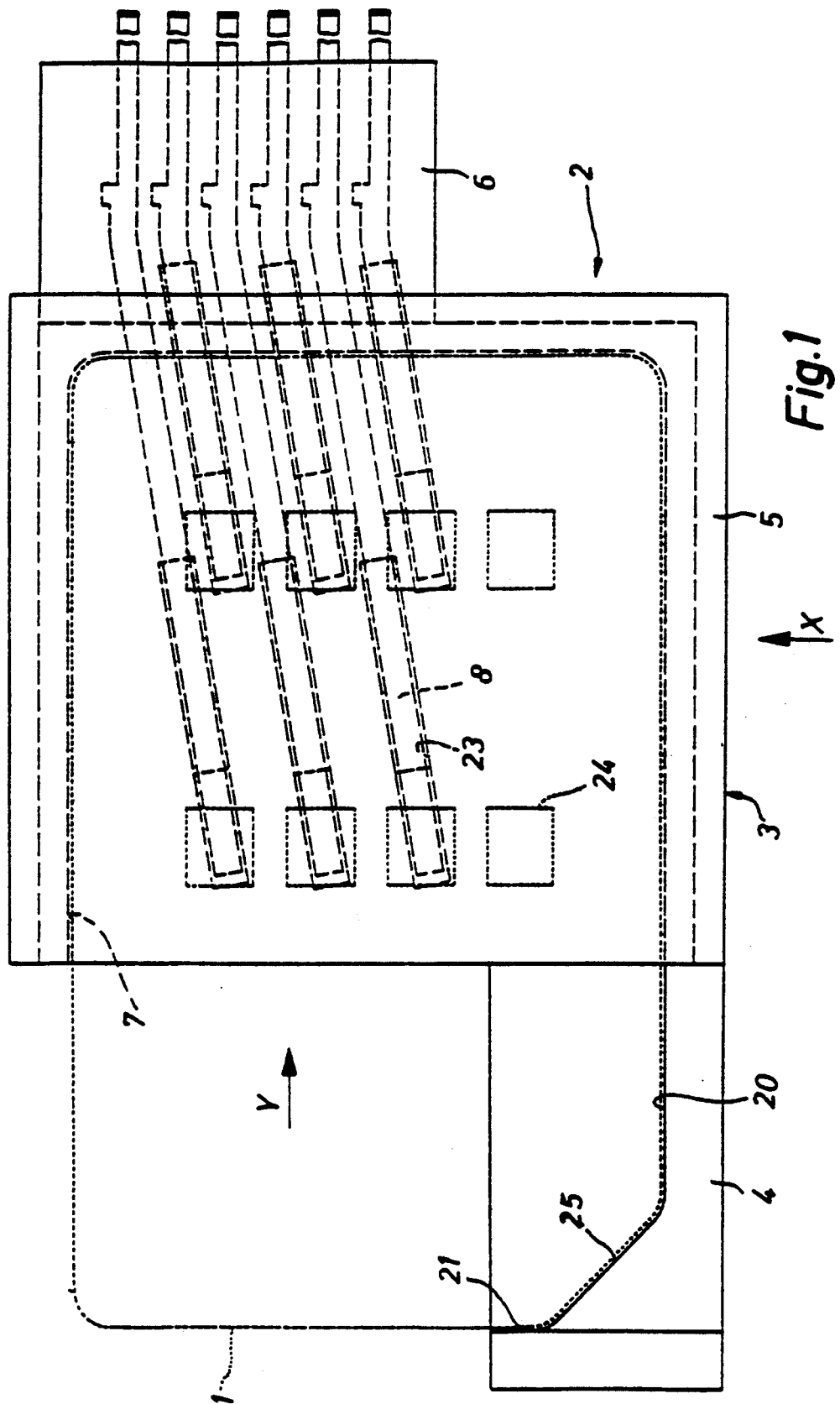

FIGS. 1 to 3 disclose a first embodiment of a contacting apparatus 2 for a chip card and, in particular, a SIM 1, respectively. The contacting apparatus 2 comprises a housing 3 which serves as a contact support. The housing 3 preferably made of plastic material as one piece; the housing 3 comprises a so called main housing portion 5 an abutment or support arm 4 projects from said main housing portion 5 (on one side) into the one direction, while an extension 6 extends in the other direction; contact elements in the form of contact springs 8 project out of said extension 6.

The main housing portion 5 comprises a receiving slot 7, into which contact springs 8 extend with their SIM-contacting ends 9. The contact elements 8 comprise further mounting sections 10 which form contact ends, for instance SMD-contact ends 11; said contact ends are adapted to come into engagement with contact regions which are for instance provided on a circuit board 12.

In case SIM 1 is inserted into the slot 7, then the SIM contact ends 9 are in engagement with respective contact regions 24 of the SIM. The supporting arm 4 forms a niche or recess 20, which in turn is provided with an inclined polarisation means 24, corresponding to an inclined polarisation means of the SIM 1, such that the properly oriented insertion of the SIM is guaranteed. For the purpose of insertion of the SIM 1 the supporting arm 4 can be resiliently bent downwardly as can be seen in FIG. 2. After the insertion and after the support arm 4 is released it will come into engagement with its support or engagement surface 21 at a respective edge of the SIM such that the SIM is safely held in said contacting apparatus. To remove the SIM the opposite steps are taken, i. e. the supporting arm 4 is pressed downwardly (see FIG. 2) so that the card (SIM 1) can be removed, which is easily possible in the large area (in FIG. 1) above the support arm 4. It can be recognized, that the support arm embraces only the smaller portion of the left front edge of the SIM I with its cross wall extending upwardly in FIG. 1.

FIG. 4 to 10 disclose a second embodiment of a contacting apparatus 32 of the invention. The contacting apparatus 32 comprises a housing 33 serving as a contact support and a cover 34. The cover 34 is pivotably mounted at the housing 33 in accordance with the invention by hinge means 38, 380. The hinge means are designed in accordance with the invention such that—by movement of the cover 34 from its closed position (FIG. 6a) into the locking position shown in FIG. 6b—it is achieved that the cover 34 can not be inadvertently opened.

The housing or the contact support 33 comprises a bottom wall 36 within which the contact elements in the form of contact springs 8 are installed. The contact springs 8 are preferably biased against a bottom side 43 of the bottom wall 36 as is clearly shown in FIG. 5 and 6. The contact springs 8 are pressed downwardly by means of the cover and the SIM when the cover (see FIG. 5) is closed.

The bottom wall 36 is provided with side walls 37 which border a recess or niche 35.

A recess 47 is provided to allow for easy gripping of the SIM 1 for opening the cover 34. Moreover, the recess 35 provides an inclined polarisation means 48. Similar to the first embodiment the contact ends 11 are adapted to contact regions which are for instance provided on a circuit board not shown. It is naturally possible to conceive different termination means for the contact element 8.

Each one recess 39 and 390, respectively is provided adjacent to the four corners of the contact support 33 as parts of the hinge means 38, 380 and of the locking means yet to be explained; said recess extends, for all practical purposes transversly with respect to the longitudinal axis 53 of the contact support 35. With regard to the shape of said recesses 39, 390 which form the hinge means 38, 380 special attention is drawn to FIG. 6a. It can be recognized that in the area of said recess 39 two recess portions 40, 42 are provided which extend deep into the sidewall 33, said recess portions 40, 42 being separated by a (less deep) projection 41. The recess 39 is open towards the bottom surface 54 of the bottom wall 36 but is closed in the upward direction.

Both hinge means 38 comprise each a recess 390 which is open towards the bottom surface 54 and partially open in upward direction. In this case, the sidewall forms a projection 55 which comprises at its bottom surface a detent surface 56, as can be recognized specifically in FIG. 6a. Due to this arrangement it is possible that, after pivoting the cover 34 to the reading position shown in FIG. 5, the cover 34 can be moved leftwardly (in FIG. 5) due to the serration at its upper surface so as to be moved into the locking position shown in FIG. 6b. During said leftward movement the pins 44 of the cover 34 which extend into the recess 39 move over the projections 41 and come into detent engagement with the recess portions 40 due to the elasticity of the cover. Inasmuch as the SIM 1 is located in the recess 34 and is held therein, the movement of the lid 34 from the lid closing position shown in FIG. 6 into the locking position shown in FIG. 6b does not cause a movement of the SIM 1.

Figure 7:
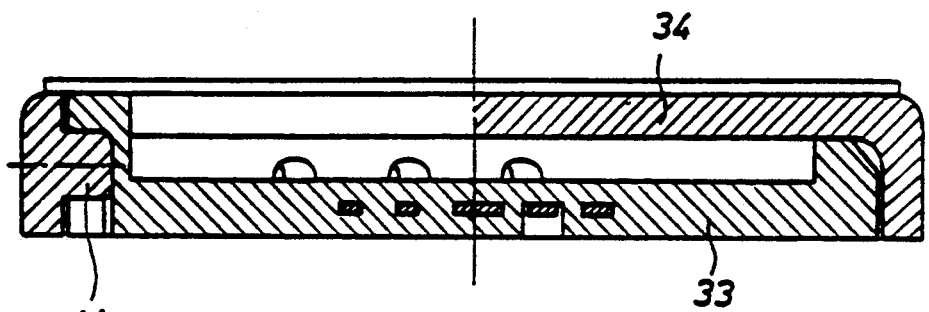
FIG. 7 is a sectional view along line C-D in FIG. 4.

The cover 34 spans the recess 35 in a manner shown in particular in FIG. 4, 7 and 8; the cover 34 supports integrally together with the already mentioned pin 44 also pins 49 which can be referred to as locking pins.

The cover 34 is in its both positions, the locked position and the delocked position engaged by detent means. In the delocked condition, the cover can be opened together with the card and the SIM 1, respectively, by lifting.

The mounting the of cover 34 at the contact support or the contact housing 833 can be designed such that the cover can be moved easily, or the arrangement can be such that the cover 34 remains in any opening position due to frictional forces.

As is shown in FIG. 6a, the recess 390 is open in upward direction such that when the cover 34 is closed, the pins 49 can come into detent engagement with the recess 390.

FIGS. 9 and 10 refer to a third embodiment of the invention, which is a modification of the second embodiment FIG. 4 and 6b insofar as the spring means have the form of a spring 50, having two arms 51, 52. The spring 50 is, on the one hand, provided at a supporting portion 57 of the cover 34. On the other hand, one arm of spring 50 is in engagement with the cover and the other arm is in engagement with the housing 33 such, that the cover 34 is biased into its opening position. The abutment of the arms 51, 52 is provided such, that a translation movement of the cover into its detent position is readily possible.

FIG. 11 to 20 disclose a fourth embodiment of a contacting apparatus 62. The contacting apparatus 62 differs from the contacting apparatus 32 in substance insofar as in accordance with the forth embodiment the SIM 1—see FIG. 13—is inserted into a cover 64, which is pivotally mounted at a housing or contact support 63. Contact elements in the form of contact springs 8 are again mounted in the housing 63 as was shown for the preceeding embodiment. The bottom wall 66 of the contact support 63 forms adjacent to the pivot point 65 of the cover an abutment shoulder (abutment surface) 88, at which the SIM 1 comes into engagement during the insertion into the cover, and at which the SIM moves along during the pivotal movement of the cover 64 into the closing position.

The hinge means 68, 680 are provided adjacent to all four corners of the housing 33. The hinge means 68 correspond to the hinge means of FIG. 4 and the hinge means 680 correspond to the hinge means 380. Thus, a detailed description of the hinge means of this embodiment does not appear to be neccessary. The pin corresponding to the pin 49 in FIG. 4 is here refered to by reference numeral 89 (see for instance FIG. 13).

For receiving and guiding the SIM 1 in the cover 64, the cover 64 is provided with two guide projections 90, 91. The projections 90, 91 define—as is shown in FIG. 13—a tunnel or shaft, wherein oppositely located wall portion 92 provide for the guidance of the SIM at its side. The abutment surface or abutment shoulder 88 at the contact support limits the depth of insertion of the SIM I. When closing the cover 64 the SIM is circulary rotated along the abutment shoulder 88 into a recess 78 of the contact support or housing 63. The card or the SIM 1 remains therein when the cover 64 is moved in longitudinal direction for the purpose of locking, so that no relative movement occurs between the card or the SIM 1 and the contact elements 8. Again, this forth embodiment can be provided like the second embodiment with a cover spring 50, i. e. a spring 50 which biases the cover 64 into its vertical position shown in FIG. 13.

Refering now to FIG. 21 to 22, the prefered design of pin 44 shown already in FIG. 4 and 10 and 11, will be explained; pin 44 is designed as follows so as to simplify the linear movement of the cover 33 into the locking or reading position: pin 44 is—as it is shown in FIG. 21 and 24—rounded at 144 at two opposite locations; on the other hand, pin 44 is—as is shown at 244 in FIG. 22—designed with a sharp edge at positions rotated by 90° at opposite locations. In this manner, it is impossible to accidentally move the cover 34 into its opening position across the projection or cam 41, inasmuch as the respective recesses—as it is shown in 344—are also having sharp edges.

Turning now to FIG. 25 to 31, a fifth embodiment of a contacting apparatus 400 will be described. This fifth embodiment differs from the proceedings embodiments in particular by the fact, that a switch 401 is provided in the contacting apparatus 400. The contacting apparatus 400 in turn comprises a housing 33 and a cover 34. In addition to the contact elements 8 for contacting the SIM card, additional contact elements or switching contacts 402, 403 are similarly provided in a biased manner in the housing 33. The contact elements 402, 403 acting as switching contacts are of the same design as the contact elements 8 which are used for contacting the SIM card. The switching contacts are, like the contact elements 8, arranged in an inclined manner, with respect to the centerline of the contacting apparatus 400. Their contact cusps are refered to by reference numerals 404 and 405. The connection between the contact elements, 402 and 403 can be made by a contact bridge 406 having a substantially H-shaped form. The two arms of the contact bridge 406 extending into the area of the contact cusps 404, 405 are referred to by reference numerals 407 and 408. As can be seen in FIG. 25, the switching contacts 402 and 403 extend leftwardly and outwardly and form their soldering terminations such that the contacting apparatus 400 obtains a higher mechanical stability; this is so, because the contacting apparatus is mounted for instance to a circuit board at diametrically opposite locations, i. e. it is mounted at its both sides, on the one hand by means of the soldering terminations of the switch contacts 402 and 403, and on the other hand by the soldering terminations of the contact elements 8.

The contact bridge 406, already mentioned, is fixably mounted in the cover 34; perferably, the contact brigde is embeded in the guide path of the cover 34.

When the cover 34 is being closed, the contact bridge 406 with its arm 408 preferably comes into engagement with the contact cusp 405 of the outermost contact element 403. By means of the longitudinal movement of the cover 34 in rightward direction—refered to by arrow 412 in FIG. 28—also the cusp 404 of the second switching contact 402 is actuated. Due to the design in accordance with the invention a securely lagging of the switch 401 is obtained when inserting the card. In fact, it is prefered that the switch 401 is not closed prior to the cover having reached its locking or reading position. Consequently then, this position is indicated by the switch 401.

The switch contacts 402 and 403 are, as already mentioned, arranged in the housing 34 in a biased manner.

As far as possible, for the embodiment shown in FIG. 25 to 31 reference numerals are used similar to the ones used for the preceeding embodiments.

We claim:

1. A contacting apparatus for an integrated circuit chip card comprising a housing for receiving said chip card, contact elements supported by said housing and means for pressing said chip card against said contact elements when it is inserted into the housing, wherein said housing comprises a recess into which the chip card is inserted, and a cover, and further comprising means for mounting the cover to the housing for rotation into a closed position, and means for mounting said cover to be further movable in a direction different than the rotation direction, relative to a chip card in the recess, to a locking position, said recess forming means for preventing relative movement between the chip card and the contact elements when the cover is moved, relative to the recess, to the locking position.

2. The contacting apparatus of claim 1, wherein said contact elements are spring biased.

3. The contacting apparatus of claim 1, wherein said housing comprises a main housing portion having a receiving slot and an extension for partially receiving the contact elements.

4. The contacting apparatus of claim 1, further comprising a switch which indicates that a locking position for the cover has been reached.

5. The contacting apparatus of claim 4, wherein said switch comprises two contact elements.

6. The contacting apparatus of claim 5, wherein said switching contact elements are arranged oppositely with respect to the other contact elements and project out of the housing.

7. The contacting apparatus of claim 5, wherein said switching contact elements are biased.

8. The contacting apparatus of claim 5, wherein said cover mounting means comprises means for mounting said cover for linear movement to said locking position after rotation of said cover into the closed position, thereby locking said chip card in a reading position, and wherein said switching contact elements contain contact cusps which are offset in the direction of linear movement of the cover.

9. The contacting apparatus of claim 8, wherein a contact element is arranged in said cover.

10. The contacting apparatus of claim 9, wherein said contact element in said cover is in the form of a contact bridge.

11. The contacting apparatus of claim 10, wherein said contact element is arranged in said cover such that when closing the cover, the contact bridge initially contacts one contact cusp of one switching contact element and when the cover is moved to its locking position, the contacting bridge contacts the cusp of the other switching contact element.

12. The contacting apparatus of claim 11, wherein said contacting bridge comprises two contact arms which cooperate with corresponding contact cusps.

13. The contacting apparatus of claim 12, wherein an edge of one of the two contact arms is located forwardly in the direction of linear movement of the cover and contacts one contact cusp when the cover is rotated to a closed position and wherein, after linear movement of the cover into its locking position, a backwardly located edge of said one of the two contact arms contacts said contact cusp while a forwardly located edge of the other contact arm contacts the other contact cusp.

14. The contacting apparatus of claim 12, wherein the width of the contact arms in the direction of movement of the cover corresponds to the amount of movement required for the locking mode.

15. The contacting apparatus of claim 14, wherein the cover can be linearly moved only in its closed position.

16. The contacting apparatus of claim 1, wherein said chip card is a subscriber identity module (SIM).

* * * * *